Patented Oct. 13, 1925.

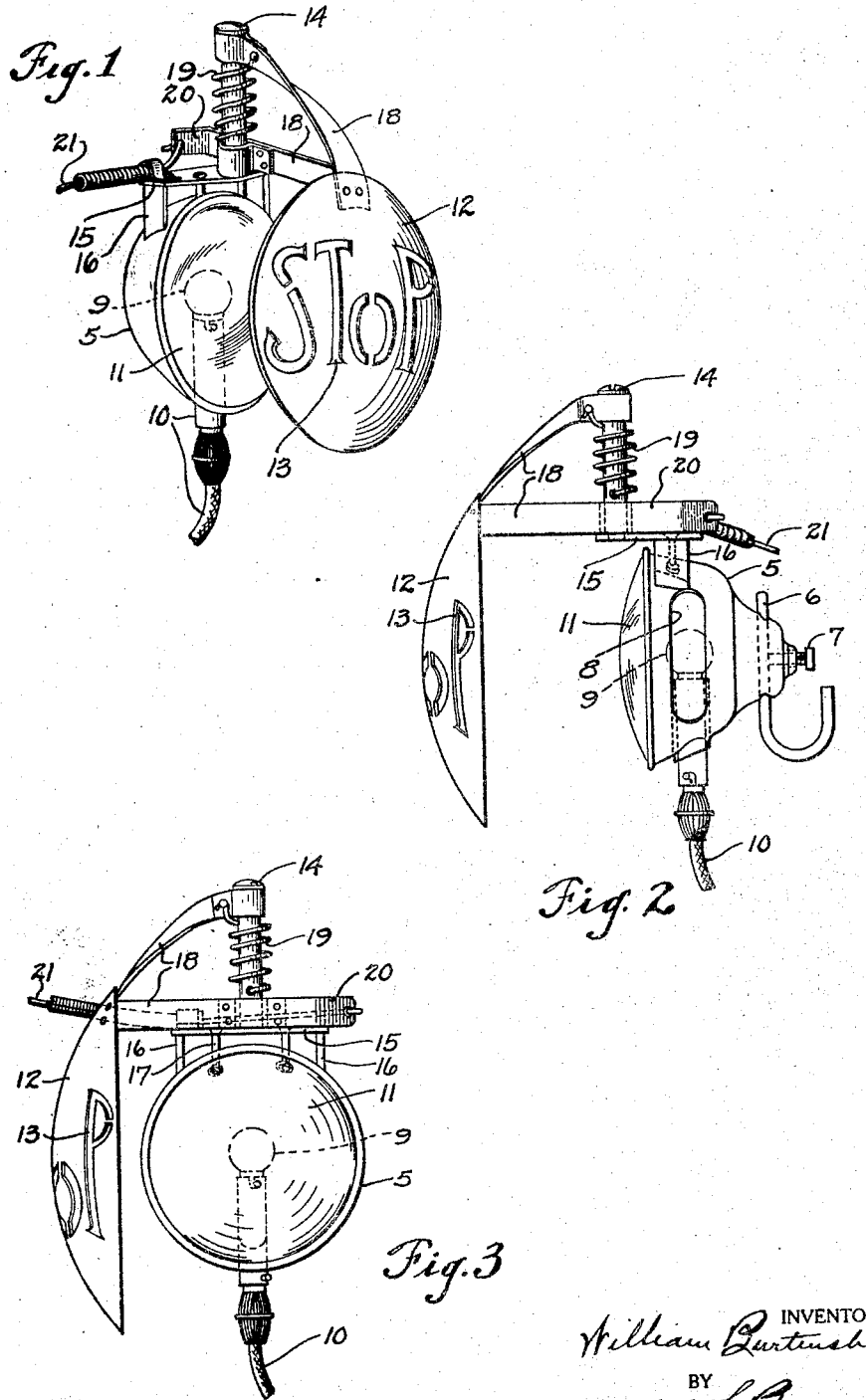

1,557,472

UNITED STATES PATENT OFFICE.

WILLIAM BURTENSHAW, OF BROOKLYN, NEW YORK.

SIGNALING DEVICE.

Application filed January 18, 1922. Serial No. 530,091.

*To all whom it may concern:*

Be it known that I, WILLIAM BURTENSHAW, a citizen of the United States, and resident of Brooklyn, in the county of Kings and State of New York, have invented certain new and useful Improvements in Signaling Devices, of which the following is a specification.

This invention relates to signaling devices particularly adapted for use on automobiles.

Signaling devices for automobiles are known in which a stop member is automatically displayed when a controller arm or lever is moved to bring about a reduction of speed or the stopping of the vehicle in order to warn the drivers of following vehicles of the anticipated change. The most favorably known type of such devices includes the moving of a signaling member into or out of signaling position in front of a lamp and this construction has, so far as I am aware, invariably taken either one of two general forms.

In one of these forms the signaling member is a hinged shutter pivoted to swing on an axis closely adjacent to a forward edge of the lamp box, the shutter being capable of being swung into signaling position in front of the lamp or out of signaling position to one side of the lamp. This form of construction has been open to the objection that the relatively large arc of curvature through which the hinged member swings requires an amount of room or space that cannot be spared in the confined and restricted position in which the lamp is ordinarily mounted on the vehicle. In addition, the swinging of the hinged member against the front and the side of the lamp produces an undesirable noise and injures the lamp structure through the impact and jar of the swinging shutter in operation.

In the other form of construction a shutter or signaling member has been hinged to swing in its own plane on a pivot at one side of the lamp structure and into or out of signaling position in front of the lamp. This construction has the disadvantage of presenting a full view of the signaling shutter in both its signaling and non-signaling positions and tends to produce confusion in interpretation of the signal.

It is an object of this invention to provide an automobile signal of the general type described which will be free from the objections and disadvantages referred to.

The present invention includes the mounting of a signaling shutter to swing bodily from a position in front of the lamp to a position above, below or at one side of the lamp in which the edge of the shutter is presented to the eye of the observer in the non-signaling position. Preferably the shutter is mounted to swing along an arc of curvature to which the plane of the shutter is a tangent, it having been found that this arrangement provides for the operation of the signal with a minimum space requirement.

Another feature of the invention resides in providing a signaling device that is self contained and does not necessarily include lamp structure but is constructed to be attached to various types of existing lamps and is therefore adapted for separate manufacture and sale.

In the drawing, in which a preferred form of the invention has been selected for illustration, Figure 1 is a view in perspective of an embodiment of the invention and showing the device in one of its signaling positions.

Figure 2 is a view in side elevation of the device shown in Figure 1.

Figure 3 is a view in front elevation of the device in its non-signaling or other signaling position.

Referring to the drawings for a more detailed description, a lamp 5 of a well known type is adapted to be mounted on a bracket member 6 on the rearmost end of an automobile or other vehicle and be held in place by the clamping screw 7. The lamp 5 is provided at one side with an opening 8 covered with glass or other transparent material which permits light rays from the electric or other lamp 9 to be projected laterally from the lamp casing 5 to illuminate any suitable license plate in a known manner. The lamp 9 may preferably be of the electric incandescent variety and supplied with current by way of the conductors 10. The rear end lamp 5 is provided with a lens formation 11 of red glass or other suitable transparent or translucent material in order to normally present a danger or warning signal to a driver approaching the vehicle from the rear.

In order to provide a signal to be employed in warning a following driver of the intended restriction in speed or bringing to a stop of the vehicle I make use of a signaling shutter 12 preferably provided with a suitable designation such as the word "Stop" formed in stencil or cut out characters in the metal comprising the shutter 12, the characters 13 preferably being covered by glass or other suitable translucent material either clear or having any desired color forming any desired combination of color with the red glass 11 forming the front of the lamp. The signaling or indicating shutter member 12 is preferably pivotally mounted on a post 14 which is seated at one end in a supporting bracket or base 15, the bracket member 15 being formed for ready attachment to existing and well known forms of lamp casings, an example of which is shown at 5 already referred to. The supporting bracket 15 is preferably provided with feet or standards 16 which engage the rounded periphery of the lamp casing and is also provided with bolts or screws 17 which may pass through openings provided for the purpose in the wall of the lamp casing in order to provide means for attaching the bracket 15 to the wall of the lamp casing.

It will be seen that the bracket member 15 supports the post 14 in a position that is parallel to a diameter of the lamp lens or glass 11, the post being in or substantially in alinement with the center of the front of the glass 11 as will be seen. A pair of bracket arms 18 which are attached at their outer extremities to the signaling shutter 12 are pivoted near the base and the top respectively of the ends of the post 14 already referred to and preferably a coil spring 19 of the torsional type is mounted in enclosing relation to the upstanding post 14 and is connected at its opposite ends to one of the arms 18 and to the post 14 in such manner as to normally cause the shutter 12 to be swung to its inoperative or non-signaling position such as is shown in Figure 3 of the drawing.

In order to swing the shutter 12 from its inoperative or non-signaling position shown in Figure 3 to the indicating or signaling position shown in Figures 1 and 2 of the drawing a rearward extension 20 is provided on the lower arm 18 to which is attached a suitable pull cord or cable 21 which may extend to a forward part of the vehicle and be attached to any suitable operating lever by which the movement of the vehicle is regulated or controlled. It will be seen that the operation of the lever which may be the brake or the clutch lever of the vehicle, exerts a pull on the wire or cable 21 and swings the shutter 12 from the position shown in Figure 3 to that shown in Figures 1 or 2 where the shutter member extends across the face of the lamp so as to display the signaling characters 13 to the eye of a person in the rear of the vehicle and facing the lamp 5.

It will be seen that I have thus provided a signaling mechanism which is self-contained, that is, which does not necessarily include in its own construction any lamp structure but which forms a separate article of manufacture and sale adapted to be readily attached to existing and well known forms of lamps of various styles and types.

It will be seen that the mounting of the shutter 12 for movement in the manner indicated requires a minimum amount of space for its operation since the shutter is bodily moved from its position in front of the lamp to its non-operative position at one side of or above or below the lamp, in which its edge is presented to the eye of the observer. Thus the shutter member while at all times being uncovered and in full view yet by being carried around to a lateral margin of the lamp in its inoperative position becomes inconspicuous and clearly differentiates from its position when extended across the front of the lamp in its signaling condition.

What I claim is:

1. A signaling device comprising, a movably mounted shutter adapted to be supported in such relation to a lamp that it can be bodily moved in an edgewise direction to occupy a position across the front of the lamp or to a position in which the edge of the shutter is presented to the eye of an observer facing the front of the lamp and to one side thereof.

2. A signaling device comprising, a lamp, a pivotally mounted shutter adapted to be swung about a vertical axis falling within the lateral margins of the lamp from a position across the front of the lamp to a position substantially at right angles thereto and to one side thereof.

3. In a signaling device for vehicles, a supporting member adapted to be attached to the side of a lamp, an arm pivotally mounted on said supporting member, a signaling shutter carried by the arm and adapted to be bodily swung along an arcuate path to which the shutter bears a tangential relation by said arm to a position across the front of the lamp or to a position at one side of the lamp at right angles to the first position.

4. In a signaling device for vehicles, a supporting member adapted to be attached to the side of a lamp, a post mounted in said supporting member in a radially disposed position with relation to the lamp, an arm pivotally mounted on said post, a signaling shutter carried by the free end of the arm and adapted to be bodily swung by the arm to a position across the front of the lamp or to a position at one side of the lamp with the edge of the shutter presented to the eye of an observer facing the front of the lamp and to one side thereof.

5. In a signaling device for vehicles, a supporting member adapted to be attached to the side of a lamp, a post mounted in said supporting member in a radially disposed position with relation to the lamp, an arm pivotally mounted on said post, a signaling shutter carried by the free end of the arm and adapted to be bodily swung by the arm to a position across the front of the lamp with the edge of the shutter presented to the eyes of an observer, a spring on said post for moving the arm and shutter into one position, and means for swinging the arm and shutter into the other position.

WILLIAM BURTENSHAW.